United States Patent [19]

Isaksen

[11] Patent Number: 5,560,967
[45] Date of Patent: Oct. 1, 1996

[54] SOUND ABSORBING AUTOMOTIVE WATER DEFLECTOR

[75] Inventor: Robert A. Isaksen, Chardon, Ohio

[73] Assignee: The Excello Specialty Company, Cleveland, Ohio

[21] Appl. No.: 279,929

[22] Filed: Jul. 25, 1994

[51] Int. Cl.⁶ ............... B32B 3/18; B32B 3/22; B32B 27/08
[52] U.S. Cl. .......... 428/71; 296/39.3; 296/191; 428/178; 428/215; 428/319.3; 428/319.9
[58] Field of Search ............ 296/39.3, 191; 428/318.4, 319.3, 319.9, 343, 354, 71, 178, 215

[56] References Cited

U.S. PATENT DOCUMENTS 4,728,566  3/1988  Lancaster et al. ............. 428/286
4,932,315  6/1990  Dixon ........................... 98/2.18
5,262,447  11/1993  Tucker ......................... 521/125
5,322,722  6/1994  Rozenberg .................... 428/40

*Primary Examiner*—Marion E. McCamish
*Assistant Examiner*—Blaine R. Copenheaver
*Attorney, Agent, or Firm*—Fay, Sharpe, Beall, Fagan, Minnich & McKee

[57] ABSTRACT

A water deflector for use in a vehicle door comprises a sheet of ether-type open cell urethane foam having opposite side faces to which are bonded thin sheets of high strength linear low density polyethylene film. The sheet has a peripheral edge shaped to overlie the desired area within the vehicle door. At least one laterally deflectable pocket forming section is formed within the sheet. The pocket forming section is constituted of a plurality of individual side-by-side closely spaced strips of the open cell urethane foam with the low density polyethylene film on the opposite side faces bridging the spaces between the spaced strips.

8 Claims, 1 Drawing Sheet

5,560,967

SOUND ABSORBING AUTOMOTIVE WATER DEFLECTOR

BACKGROUND OF THE INVENTION

The subject invention is directed to the art of water deflectors and, more particularly, to a water deflector construction having excellent sound absorbing qualities.

Water deflectors or protectors are commonly used in the automotive industry to protect inner door trim panels, as well as components mounted thereon, from being damaged by water entering the interior of the doors. Vehicle manufacturers have also been interested in achieving sound insulation through the use of such deflectors.

One type of water deflector which has been in use for some time comprises a layer of closed cell polyethylene foam sandwiched between thin layers of polyethylene film. This sheet construction can be processed using standard techniques and performs satisfactorily in its water deflecting function; however, it does not contribute significantly in terms of sound insulating qualities.

While various material combinations have been proposed for use as sound insulating water deflectors, these combinations have typically had significant drawbacks in terms of cost and/or processing difficulties. For example, it is often desirable to provide the deflectors with pocket-like bulges or non-planar sections to better conform to the surface to be protected or to accommodate mechanisms and components within the doors. Some combinations can be given such configuration only by slow and comparatively expensive thermoforming and vacuum forming techniques. Relatively inexpensive and rapid mechanical forming techniques such as described in commonly assigned U.S. Pat. Nos. 4,696,848; 4,865,791; and 4,873,132 cannot be used for certain of the proposed combinations.

As can be seen from the foregoing, a need exists for a suitable material or combination of materials and deflector design that will permit obtaining both water deflecting and sound insulating characteristics in a simple, inexpensive construction.

SUMMARY OF THE INVENTION

In accordance with the subject invention, there is provided a water deflector sheet which has improved sound absorbing qualities. The sheet comprises first and second layers of high strength linear low density polyethylene film bonded to the opposite side faces of an open cell urethane foam. Preferably, the urethane foam is an ether type.

Preferably, and in accordance with a more limited aspect of the invention, the first and second layers of linear low density polyethylene film have a thickness in the range of about 2 to 4 mils. Additionally, the first and second layers preferably completely cover the opposite side faces of the urethane foam.

The water deflector sheet having the above-noted characteristics can be processed and worked using well known mechanical techniques. In addition, in accordance with a further aspect of the invention, the water deflector sheet of the structure described can include at least one laterally deflectable pocket forming section therein. The laterally deflectable pocket forming section can be constituted by a plurality of individual side-by-side closely spaced strips of the open cell urethane foam with the low density polyethylene on the opposite side faces joining and bridging the spaces between the spaced strips. The pocket forming section as described can be formed using techniques described in commonly assigned U.S. Pat. No. 4,865,791 issued Sep. 12, 1989 for "Method of Forming a Surface Protector With an Expansible Pocket." More particularly, the pocket forming sections can be mechanically formed by intermeshing blade-like members which cause stretching of the low density polyethylene sheets on the opposite side faces of the closed cell urethane foam. By interengaging the blade members in a sufficient amount, the close cell foam is ruptured in the area between the strips and the bridging portions of low density polyethylene film stretched permanently elongated so that the resulting structure can be deflected laterally to form a pocket.

In addition, and in accordance with still another aspect of the invention, the water deflector sheet preferably has at least portions of its peripheral edge defined by one or more narrow strips of urethane foam with the low density polyethylene film on the opposite side faces joining the narrow strips in spaced relationship to the remainder of the sheet of urethane foam. The narrow edge strip which is spaced from the remaining body of the urethane foam acts to prevent wicking or absorption of water from the peripheral edge into the central body of open cell foam. Thus, even when the edge is subjected to water, the water cannot effective enter into the main body of open cell foam because of the narrow edge strip which is spaced from the remainder of the foam.

The use of an open celled urethane foam between the two layers of polyethylene film produces a water deflector sheet which has a significant increase in sound absorbing qualities as compared to prior sheet constructions in which a closed cell foam was used. In addition, the surprising result of being able to mechanically produce the pocket forming sections by stretching the polyethylene surface sheets and producing a rupture in the open cell foam is surprising and unexpected.

As can be seen from the foregoing, a primary object of the invention is the provision of an improved water deflector sheet construction.

Yet another object of the invention is the provision of a water deflector sheet which has significantly increased sound absorbing or installing qualities together with characteristics which allow processing of the sheets using known techniques.

A still further object is the provision of a water deflector sheet construction which has the advantages described but which is comparatively inexpensive.

BRIEF DESCRIPTION OF THE DRAWINGS

The above and other objects and advantages will become apparent from the following description when read in conjunction with the accompanying drawings wherein.

DETAILED DESCRIPTION OF THE PREFERRED EMBODIMENT

Figure 1:
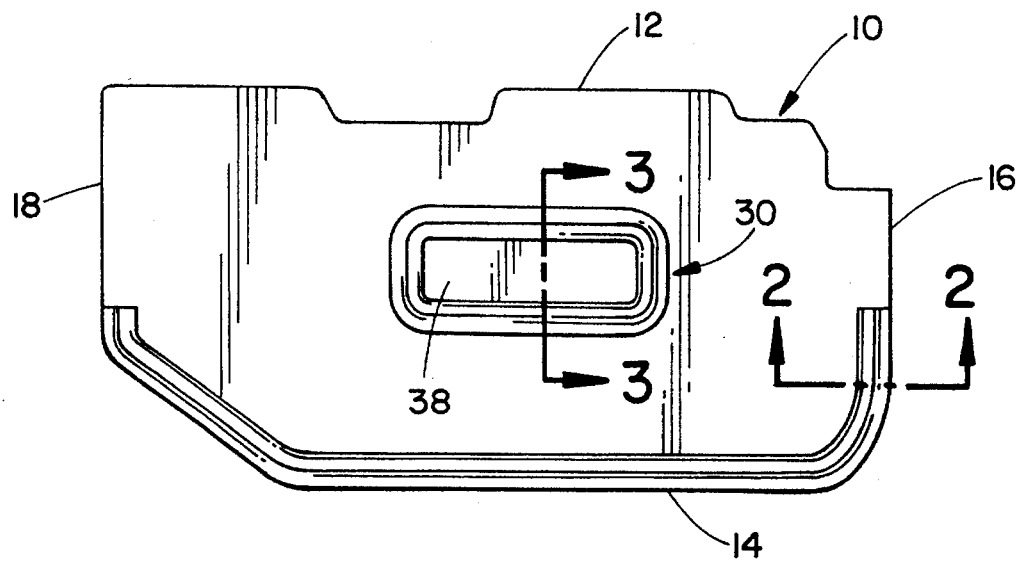
FIG. 1 is a plan view showing a typical water deflector sheet construction formed in accordance with the subject invention.

Referring more particularly to the drawings wherein the showings are for the purpose of illustrating the preferred embodiment of the invention only and not for the purpose of limiting same, FIG. 1 illustrates a water deflector sheet 10 which is particularly intended for use in a vehicle door construction to protect the door trim panel from water and to also cover and overlie certain door mounted components such as speakers, window and door electric switch mechanisms, and the like. The peripheral shape of the protector in FIG. 1 is merely exemplary and this shape is selected and designed so that it overlies and totally covers those portions of the inner door panel through which water might enter from within the door. The peripheral shape can vary significantly, but generally comprises an upper edge portion 12, a lower edge portion 14, and end edges 16 and 18. Various openings for the passage of wires and the like are often formed through the water deflector sheet.

The particular structure of the subject sheet is a multi-layer composite including a central layer or sheet 20 formed of an ether-type open cell urethane foam. Preferably, the foam has a thickness in the range of at least about 50 to 500 mils. Additionally, although many different types of open cell urethane foam could be used, the subject preferred form has a density of 1.7 pounds per cubic foot.

Bonded to the opposite faces 22, 24 of the central sheet of open cell urethane foam are separate continuous and imperforate sheets of a high strength linear low density polyethylene film. In the preferred embodiment, an octene-type linear low density polyethylene film is used. These sheets are identified with the numerals 26 and 27, respectively. They are bonded in firm, tight engagement with the urethane foam in a conventional manner through the use of flame bonding or heat lamination. Preferably, the sheets have a thickness in the range of 1 to 10 mils.

Figure 3:
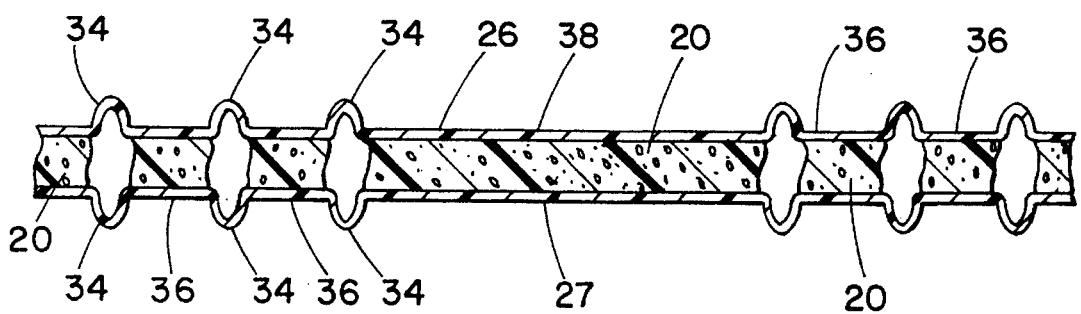

The layers of high strength octene-type linear low density polyethylene film act to seal the central layer of open cell urethane foam against water entering therein. The open cell urethane foam does, however, have significant sound absorbing and insulating qualities. In addition, however, the particular combination of open cell urethane foam and high strength octene-type linear low density polyethylene film offers distinct advantages in terms of processing the water deflector sheet of the subject invention. In particular, it is often desirable to provide the deflector sheets with laterally deflectable pocket areas to allow the sheets to better conform to various structures and surfaces within the door. For example, area 30 of FIG. 1 is a laterally deflectable pocket formation. The particular combination of materials from which sheet 10 is formed allow such pockets to be mechanically produced in the manner of the noted U.S. Pat. No. 4,865,791, the disclosure of which is incorporated herein by reference. The materials of the subject sheet can be mechanically deformed through the use of interengaging closely spaced blade-like members as described in this prior patent. The amount of inner penetration of the blade-like tools can be greatly increased from that which was previously used or that which was thought practical. Surprisingly, by increasing the amount of interpenetration, the high strength octene-type linear low density polyethylene film layer can be significantly stretched in the area between the edges of the inner penetrating tools. The pieces or strips which pass over the tools themselves are not significantly stretched. While the stretching of the outer layers of the polyethylene films takes place, the intermediate sheet of open cell urethane foam stretches a significantly less amount and actually fractures in the area between the highly stretched portions of the polyethylene film. Normally, the urethane foam fractures when subjected to 200% stretching or elongation. The octene-type polyethylene film is, however, stretched to between 600% and 700% without fracturing. This is generally shown in FIGS. 1 and 3 wherein the stretched portions 34 are serving as bridges between the narrow closely spaced strips of open cell urethane foam which have fractured as a result of the stretching. The strips 36 are, in the subject embodiment, circumferentially continuous strips about the unstretched central area 38. As can be seen in FIGS. 1 and 3, the unstretched central area 38 can be deflected laterally from the plane of the remainder of the sheet merely by applying a lateral force thereto. The sections 34 of the polyethylene film are thinner and bridge the spaces between the various strips and portions of closed cell urethane foam of the central portion of the sheets be. Surprisingly, even though the polyethylene film is tightly bonded to the intermediate layer 20 of open cell urethane foam, the fracturing and elongation takes place readily if the interpenetration of the forming tools is carried out to a sufficient degree. This amount of penetration can be quickly determined for each particular combination of film and foam used.

The forming of the pocket forming section can take place before or after the water deflector sheet 10 has been cut to its desired peripheral size and configuration; however, it is normally done before cutting the sheet to size because of the need for the edge portions of the sheet for gripping and holding during the pocket forming operation. Additionally, as discussed in the noted prior patents, pressure sensitive adhesive can be applied to the periphery or various other locations as desired for mounting and installation.

Figure 2:
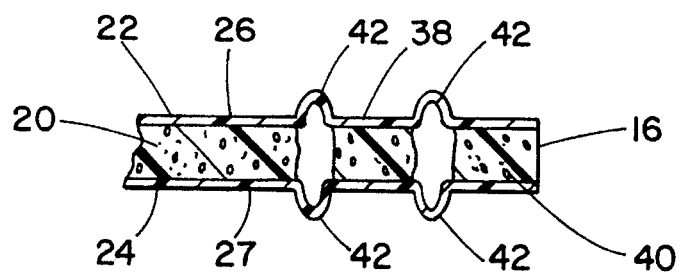
FIG. 2 is a cross-sectional view through the peripheral edge of the water deflector sheet of FIG. 1 (the view is taken on lines 2—2 of FIG. 1); and, FIG. 3 is a cross-sectional view taken on lines 3—3 of FIG. 1.

An added feature of the subject invention is the use of the stretching and deforming technique to provide an edge design which prevents absorption of water by the main body of open cell urethane foam. In particular, as illustrated in FIG. 1, the lower peripheral edge portion 14 is provided with a deformed separate strip portion 38 and 40. The strips run along at least a portion of the peripheral edge of the sheet be. In the FIGS. 1 and 2 showing, the entire lower edge 14 is provided with the separate strips 38 and 40 which are joined by bridging sections 42 of the outer layers of polyethylene film. The separate strips and the bridging sections are formed using the interengaging forming tool techniques which are used to form the pocket section 30. By separating strips 38 and 40 from the main body of the sheet, any moisture which contacts along the lower peripheral edge 14 can enter only into the first strip section, e.g., 40, and since strip section 40 is separated from adjacent strip section 38 and the main body section of open cell foam, the moisture cannot wick up or absorb into the center portion of the water deflector sheet 10.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A water deflector for use in a vehicle door comprising:

a sheet of ether type open cell urethane foam having opposite side faces to which are bonded thin sheets of high strength octene type linear low density polyethylene film;

said sheet having a peripheral edge shaped to overlie the desired area within the vehicle door; and, at least one laterally deflectable pocket forming section within the sheet, said laterally deflectable pocket forming section constituted of a plurality of individual side-by-side strips of the open cell urethane foam spaced from one another with the low density polyethylene film on the opposite side faces bridging the spaces between the spaced strips.

2. The water deflector of claim 1 wherein the spaced strips are in the form of concentric rings.

3. The water deflector of claim 2 wherein the concentric rings are non-circular rings.

4. The water deflector of claim 1 wherein at least portions of the peripheral edge of the deflector are defined by a narrow strip of the urethane foam with the low density polyethylene film on the opposite side faces joining the narrow strip to the remainder of the sheet of urethane foam in spaced relationship thereto.

5. The water deflector of claim 1 wherein the polyethylene film sheets are in the range of about 1 to 10 mils thick.

6. A water deflector sheet having improved sound absorbing qualities comprising first and second layers of high strength linear low density polyethylene film bonded to the opposite side faces of a layer of open cell urethane foam, said first and second layers substantially completely covering the opposite side faces of said foam, and said sheet having a peripheral edge portion defined by a narrow strip of urethane foam spaced from adjacent portions of said layer of urethane foam with said strip of urethane foam joined to said layer of urethane foam by the said layers of polyethylene film.

7. The water deflector sheet as defined in claim 6 wherein said layer of foam has a thickness greater than 50 mils.

8. The water deflector sheet as defined in claim 7 wherein said polyethylene film sheets are in the range of 1 to 10 mils.

* * * * *